US006980803B2

(12) United States Patent
Johansson

(10) Patent No.: US 6,980,803 B2
(45) Date of Patent: Dec. 27, 2005

(54) USING STATISTICALLY ASCERTAINED POSITION FOR STARTING SYNCHRONIZATION SEARCHER DURING DIVERSITY HANDOVER

(75) Inventor: Steffan Johansson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 503 days.

(21) Appl. No.: 09/998,921

(22) Filed: Dec. 3, 2001

(65) Prior Publication Data

US 2002/0068567 A1     Jun. 6, 2002

Related U.S. Application Data

(60) Provisional application No. 60/250,474, filed on Dec. 4, 2000, provisional application No. 60/250,475, filed on Dec. 4, 2000.

(51) Int. Cl.$^7$ ................................. H04Q 7/20
(52) U.S. Cl. .................. 455/438; 455/436; 455/437; 455/439; 455/442; 370/331; 370/332
(58) Field of Search ................ 455/436–444, 455/450–452.2, 456.1–456.6, 516, 517, 552.1; 370/331–334

(56) References Cited

U.S. PATENT DOCUMENTS

| | | | |
|---|---|---|---|
| 5,263,026 A | 11/1993 | Parr et al. | |
| 5,267,261 A | 11/1993 | Blakeney, II et al. | |
| 5,406,593 A | 4/1995 | Chennakeshu et al. | |
| 5,448,600 A | 9/1995 | Lucas | |
| 5,490,165 A | 2/1996 | Blakeney, II et al. | |
| 5,530,912 A | 6/1996 | Agrawal et al. | |
| 5,533,063 A | 7/1996 | Mitra et al. | |
| 5,572,221 A * | 11/1996 | Marlevi et al. | 342/452 |
| 5,577,022 A | 11/1996 | Padovani et al. | |

(Continued)

FOREIGN PATENT DOCUMENTS

WO          96/10873          4/1996

(Continued)

OTHER PUBLICATIONS

3rd Generation Partnership Project; Technical Specification Group Radio Access Network; Synchronization in UTRAN Stage 2 (Release 1999), 3GPP TS 25.402 V3.3.0 (Sep. 2000).

(Continued)

*Primary Examiner*—Stephen D'Agosta
(74) *Attorney, Agent, or Firm*—Nixon & Vanderhye, P.C.

(57) ABSTRACT

A code division multiple access communication system comprises a source base station ($BS_S$), a destination base station ($BS_D$) having a synchronization searcher (S), and a time position estimator (100) which establishes a start position of a synchronization search window for the synchronization searcher of the destination station. In accordance with an aspect of the present system, the time position estimator establishes the start position (SP) of the synchronization search window based on a statistical estimate of the time position at which other mobile stations previously initiated handover from the source base station to the destination base station. In a non-limiting example embodiment, the time position estimator uses an average time position ($T_{new}$) at which other mobile stations previously initiated handover from the source base station to the destination base station as the statistical estimate. In an example illustrated embodiment, the time position estimator is situated at a radio network control node (26) of the code division multiple access communication system, but can be located at other nodes.

29 Claims, 8 Drawing Sheets

U.S. PATENT DOCUMENTS

| | | | |
|---|---|---|---|
| 5,644,591 A | | 7/1997 | Sutton |
| 5,649,290 A | * | 7/1997 | Wang ......................... 370/332 |
| 5,652,748 A | | 7/1997 | Jolma et al. |
| 5,654,979 A | | 8/1997 | Levin et al. |
| 5,703,873 A | | 12/1997 | Ojanpera et al. |
| 5,726,982 A | | 3/1998 | Witter |
| 5,790,589 A | | 8/1998 | Hutchison, IV et al. |
| 5,818,866 A | | 10/1998 | Wilk |
| 5,818,876 A | | 10/1998 | Love |
| 5,828,659 A | | 10/1998 | Teder et al. |
| 5,881,058 A | | 3/1999 | Chen |
| 5,893,033 A | | 4/1999 | Keskitalo et al. |
| 5,907,809 A | | 5/1999 | Molnar et al. |
| 5,913,169 A | | 6/1999 | Vaara |
| 5,991,626 A | | 11/1999 | Hinz et al. |
| 6,052,598 A | * | 4/2000 | Rudrapatna et al. ..... 455/456.1 |
| 6,064,885 A | | 5/2000 | Rouhollahzadeh et al. |
| 6,104,712 A | | 8/2000 | Robert et al. |
| 6,151,311 A | * | 11/2000 | Wheatley et al. ........... 370/335 |
| 6,163,696 A | * | 12/2000 | Bi et al. ...................... 455/436 |
| 6,370,397 B1 | | 4/2002 | Popović et al. |
| 6,711,408 B1 | * | 3/2004 | Raith ......................... 455/440 |
| 6,717,978 B1 | * | 4/2004 | Yang et al. ................. 375/150 |

FOREIGN PATENT DOCUMENTS

| | | |
|---|---|---|
| WO | 96/19056 A | 6/1996 |
| WO | 96/24988 A | 8/1996 |
| WO | 97/02714 A | 1/1997 |
| WO | 98/52378 | 11/1998 |
| WO | 99/23847 A1 | 5/1999 |
| WO | 99/57819 | 11/1999 |
| WO | 99/63677 A | 12/1999 |
| WO | 99/63713 | 12/1999 |
| WO | 00/51393 A1 | 8/2000 |
| WO | 01/17125 A1 | 3/2001 |

OTHER PUBLICATIONS

U.S. Appl. No. 09/452,100, filed Dec. 4, 1999, entitled "Synchronization of Diversity Handover Destination Base Station".

International Search Report mailed Jun. 14, 2002 in corresponding PCT application PCT/SE01/02685.

Iiguy et al, "Performance Analysis of Uplink Handover Searcher in Asynchronous WCDMA System", IEEE Electronics and Telecommunications Research Institute, 2001, pp. 286-290, XP002902476.

U.S. Appl. No. 09/931,280, Entitled "Preliminary Performance of Handover Function in Telecommunications System" filed Aug. 17, 2001.

U.S. Appl. No. 09/931,580, Entitled "Dynamic Offset Threshold for Diversity Handover in Telecommunications System" filed Aug. 17, 2001.

U.S. Appl. No. 09/998,934, Entitled "Using Geographical Coordinates to Determine Mobile Station Time Position for Synchronization During Diversity Handover" filed Dec. 3, 2001.

*Radio Resource Management Strategies*, 3G TR 25.922, Ver. 3.5.0, Sep. 1999, generated by the Third Generation Partnership Project, Technical Specification Group RAN, Working Group 2 (WG2).

Hellebrandt et al, "Location Tracking of Mobiles in Cellular Radio Networks", IEEE Transactions on Vehicular Technology, vol. 48, No. 5, Sep. 1999, pp. 1558-1562.

3rd Generation Partnership Project; Technical Specification Group Radio Access Network; RRC Protocol Specification (Release 1999), 3GPP TS 25.331 V3.6.0 (Mar. 2001).

* cited by examiner

USING STATISTICALLY ASCERTAINED POSITION FOR STARTING SYNCHRONIZATION SEARCHER DURING DIVERSITY HANDOVER

This application claims the priority and benefit of U.S. Patent Provisional Application Ser. No. 60/250,474, filed Dec. 4, 2000, entitled "USING STATISTICALLY ASCERTAINED POSITION FOR STARTING SYNCHRONIZATION SEARCHER DURING DIVERSITY HANDOVER" and is related to the following U.S. patent applications, all of which are incorporated herein by reference: U.S. Patent Application Ser. No. 60/250,475, filed Dec. 4, 2000 entitled "USING GEOGRAPHICAL COORDINATES TO DETERMINE MOBILE STATION TIME POSITION FOR SYNCHRONIZATION DURING DIVERSITY HANDOVER"; U.S. patent application Ser. No. 09/931,580, entitled "DYNAMIC OFFSET THRESHOLD FOR DIVERSITY HANDOVER IN TELECOMMUNICATIONS SYSTEM"; and U.S. patent application Ser. No. 09/931,280, entitled "PRELIMINARY PERFORMANCE OF HANDOVER FUNCTIONS IN TELECOMMUNICATIONS SYSTEM".

BACKGROUND

1. Field of the Invention

The invention pertains to data communications systems, and particularly to diversity handover (e.g., soft handover) in a telecommunications system such as a wideband code division multiple access telecommunications system.

2. Related Art and other Considerations

In a typical cellular radio system, mobile stations (MS), also known as mobile user equipment units (UEs), communicate via a radio access network (RAN) to one or more core networks. The mobile stations (MSs)/user equipment units (UEs) can be mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the mobile stations within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system. An undertaking known as the Third Generation Partnership Project (3GPPP) has endeavored to evolve further UTRAN and GSM-based radio access network technologies.

As those skilled in the art appreciate, in W-CDMA technology a common frequency band allows simultaneous communication between a mobile station (MS) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a mobile station (MS) need not switch frequency when handoff of a connection is made from one cell to another. As a result, a destination cell can support a connection to a mobile station (MS) at the same time the origination cell continues to service the connection. Since the mobile station (MS) is always communicating through at least one cell during handover, there is no disruption to the call. Hence, the term "soft handover." In contrast to hard handover, soft handover is a "make-before-break" switching operation.

Direct sequence code division multiple access (DS-CDMA) thus allows signals to overlap in both time and frequency so that CDMA signals from multiple users simultaneously operate in the same frequency band or spectrum. In principle, a source information digital data stream to be transmitted is impressed upon a much higher rate data stream generated by a pseudo-random noise (PN) code generator. This combining of a higher bit rate code signal with a lower bit rate data information stream "spreads" the bandwidth of the information data stream. Each information data stream is allocated a unique PN or spreading code (or a PN code having a unique offset in time) to produce a signal that can be separately received at a receiving station. From a received composite signal of multiple, differently-coded signals, a PN coded information signal is isolated and demodulated by correlating the composite signal with the specific PN spreading code associated with that PN coded information signal. This inverse, de-spreading operation "compresses" the received signal to permit recovery of the original data signal and at the same time suppresses interference from other users.

In addition to receiving signals transmitted from several different transmitting information sources, a receiver may also receive multiple, distinct propagation paths of the same signal transmitted from a single transmitter source. One characteristic of such a multipath channel is an introduced time spread. For example, if an ideal pulse is transmitted over a multipath channel, the corresponding signal appears at the receiver as a stream of pulses, each pulse or path having a corresponding different time delay, as well as different amplitude and phase. Such a complex received signal is usually referred to as the channel impulse response (CIR).

A CDMA receiver employs a multipath search processor that searches for and identifies the strongest multipaths along with their corresponding time delays. A RAKE demodulator captures most of the received signal energy by allocating a number of parallel demodulators (called RAKE "fingers") to the strongest multipath components of the received multipath signal as determined by the multipath search processor. The RAKE finger outputs are diversity-combined, after corresponding delay compensation, to generate a "best" demodulated signal that considerably improves the quality and reliability of communications in a CDMA cellular radio communications system.

The multipath search processor, (sometimes referred to herein as simply a "searcher"), identifies the channel impulse response of a complex received signal in order to extract the relative delays of various multipath components. The searcher also tracks changing propagation conditions resulting from movement of the mobile station or some other object associated with one of the multipaths to adjust the extracted delays accordingly.

More specifically, the channel impulse response of a received multipath signal is estimated within a certain range of path arrival times or path arrival delays called a "search window." All signals detected within the search window form the delay profile, but only those signals originated by the transmitter belong to the channel impulse response. The remaining received signals in the delay profile are noise and interference. When the signals forming the delay profile are represented by their respective powers and delays, the delay profile is called a power delay profile (PDP).

Space diversity is attained by providing multiple signal paths through simultaneous links from a mobile station through two or more base stations. When the mobile station is in communication with two or more base stations, a single signal for the end user is created from the signals from each base station. As mentioned above, this diversity communication is sometimes referred to as a "soft" handover in that communication with a destination base station is established before communication with the source base station is terminated. Thus, after a call is initiated and established between a mobile station and a serving base station, the mobile station continues to scan a broadcast signal transmitted by base stations located in neighboring cells. Broadcast signal scanning continues in order to determine if one of the neighboring base station transmitted signals is strong enough for a handover to be initiated. If so, this determination is provided to the radio network which sends the appropriate information to the mobile station and to the new destination base station to initiate the diversity handover. The new base station searches for and finds the mobile station's transmitted signal using the associated spreading code. The destination base station also begins transmitting a downlink signal to the mobile station using the appropriate spreading code. The mobile station searches for this downlink signal and sends a confirmation when it has been received.

Diversity handover requires timing synchronization between the source and destination base stations and the mobile station. Synchronization should be achieved as rapidly and as simply as possible. In the downlink direction (from the base station to the mobile station), the mobile station locates and uses a known pilot signal contained in the base station broadcast channels to temporarily synchronize with the radio network system time. In the uplink direction (from the mobile station to the base station), a known pilot signal transmitted from the mobile station permits the source base station to estimate the channel impulse response for the uplink channel. Using this channel impulse response, the source base station derives synchronization signals necessary to extract the known pilot symbols from the received signal samples. Initial synchronization process occurs after the mobile station performs a random access over an uplink random access channel to acquire a traffic channel from the base station. At the completion of a successful random access procedure, the source base station is synchronized to the first arrived and detected multipath signal component originated by the mobile station and thereafter extracts pilot symbols later transmitted by the mobile station on the uplink traffic channel. For the W-CDMA context, radio interface synchronization in general is described in 3GPP TS 25.402. V3.3.0 (2000-09), which is the Technical Specification Group Radio Access Network, Synchronization in UTRAN Stage 2 (Release 1999) of the $3^{rd}$ Generation Partnership Project.

During the synchronization procedure for the destination base station, a difficulty arises because there is an unknown propagation delay from the destination base station to the mobile station, and an unknown propagation delay from the mobile station to the destination base station. The sum of these propagation delays is called the round-trip delay, and it determines the delay between the transmit timing of the destination base station and the time when the signal is received at the mobile station. Namely, the mobile station receives the signal transmitted from the destination base station after a certain propagation delay from the instant when the signal is transmitted. The transmitted signal from the mobile station is synchronized with the received signal at the mobile station, so the transmitted signal from mobile station is delayed with respect to the base station transmission. The additional propagation delay from mobile station to the base station makes the delay of the received signal at the base station equal to the round-trip propagation delay.

The round-trip propagation delay is unknown in diversity handover because there is no random access uplink channel communication between the mobile station and the destination base station like there was with the source base station when the call connection was initially established. During the random access process, the propagation delay between the source base station and the mobile station is measured and used to facilitate the source base station synchronization. Since the round-trip delay between the mobile and destination base station is unknown, the searcher in the destination base station must scan all possible multipaths that could be generated by the mobile station located anywhere in the cell corresponding to the destination base station.

Since maximum delay of the received signal from the mobile station is unknown, a longer search window may be used to cover the maximum possible round-trip propagation delay, which corresponds to the destination base station cell size. As an example, a base station cell having a ten kilometer radius would have a corresponding maximum round-trip propagation delay of approximately eighty microseconds. A typical search window used in the source base station is on the order of ten microseconds. However, the search window in the destination base station would need to be eight times longer in order to accommodate the 80 microsecond propagation delay for this ten kilometer radius cell. Such a long search window is undesirable because of the increased data processing and memory resources required to perform the larger number of search and demodulation operations associated therewith. This large number of operations means increased synchronization delays. A longer search window therefore lessens the ability of the destination base station to respond to changes in the radio channel which translates, ultimately, into increased bit errors in the RAKE receiver outputs.

What is needed therefore, and an object of the present invention, is a technique which provides rapid synchronization of the destination base station receiver to the mobile station's uplink transmission in a diversity handover situation.

BRIEF SUMMARY OF THE INVENTION

A code division multiple access communication system comprises a source base station, a destination base station having a synchronization searcher, and a time position estimator which establishes a start position of a synchronization search window for the synchronization searcher of the destination station. The synchronization search window detects, for synchronization purposes, a transmission of the specified mobile station received at the destination base station during a handover of a connection involving the specified mobile station from the source station to the destination base station. In accordance with an aspect of the present invention, the time position estimator establishes the start position of the synchronization search window based on a statistical estimate of the time position at which other mobile stations previously initiated handover from the source base station to the destination base station.

In a non-limiting example embodiment, the time position estimator uses an average time position at which other mobile stations previously initiated handover from the source base station to the destination base station as the statistical estimate. In an illustrated example embodiment, the time position estimator maintains a filter which calculates a filter output value of the average time position $T_{new}$ for the specified mobile station. The filter output value is calculated using the expression $T_{new}=a*T_{old}+(1-a)*T_{last}$. In this expression, $T_{last}$ is a time position found for a last mobile station which initiated handover from the source base station to the destination base station prior to the specified mobile station; $T_{old}$ is an output value of the filter prior to the filter being updated with the time position found for the last mobile station which initiated handover from the source base station to the destination base station prior to the specified mobile station; and a is a weighting factor.

In the example illustrated embodiment, the time position estimator is situated at a radio network control node of the code division multiple access communication system, but can be located at other nodes. The node whereat the time position estimator resides communicates the start time position to the synchronization searcher of the destination base station.

In another aspect of the invention, the time position estimator maintains a table which, for each of plural scenarios of source base stations and destination base stations, stores a corresponding scenario-specific start time position.

In accordance with yet another aspect of the present invention, if the mobile station is not found at the start time position, the synchronization searcher attempts to find the transmission of the mobile station by looking at a search window position which neighbors the start time position. More particularly, with a failure to find the transmission of the specified mobile station, the synchronization searcher looks at progressively remote neighboring search window positions relative to the start time position. That is, if the specified mobile station is not found at the start time position, the synchronization searcher attempts to find the transmission of the mobile station by looking at a first neighboring search window position on a first side of the start time position, and then, if necessary, looking at a second neighboring search window position on a second side of the start time position. The first neighboring search window position on the first side of the start time position and the second neighboring search window position on the second side of the start time position comprise a set of most neighboring search window positions. Upon failure to find the transmission of the specified mobile station at either of the most neighboring search window positions, the synchronization searcher looks at progressively remote sets of neighboring search window positions, thus looking in a widening circle of search positions about the start search position.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1A:
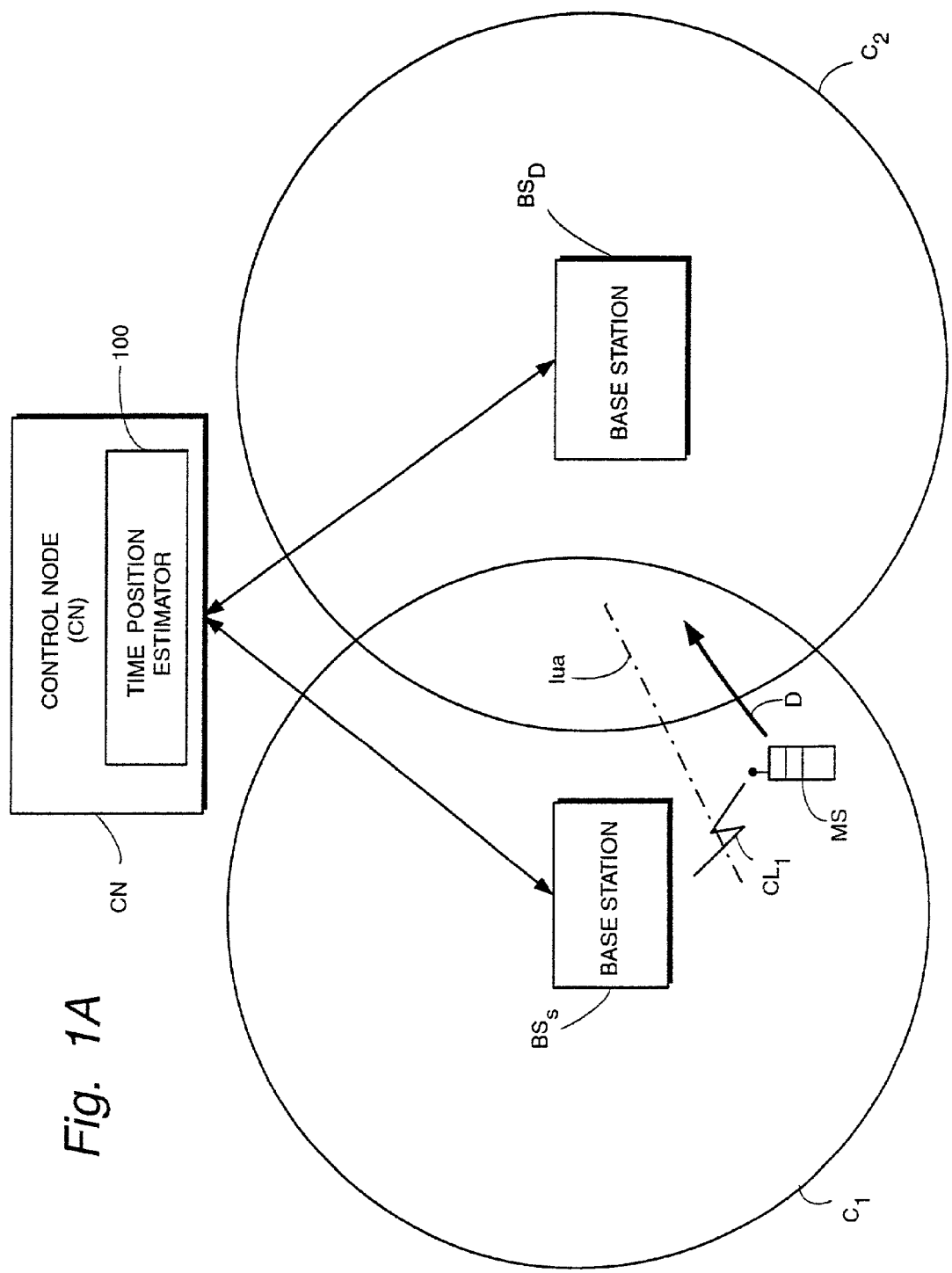
FIG. 1A is a schematic view of portions of telecommunications system according to an example, non-limiting embodiment of the present invention, showing a pre-soft handover situation.

FIG. 1A shows a code division multiple access communication system which comprises a source base station $BS_s$, a destination base station $BS_D$ having a synchronization searcher S, and a control node CN. The source base station $BS_s$ serves a cell $C_1$; the destination base station $BS_D$ serves a cell $C_2$. The control node CN controls the source base station $BS_s$ and the destination base station $BS_D$.

Figure 1B:
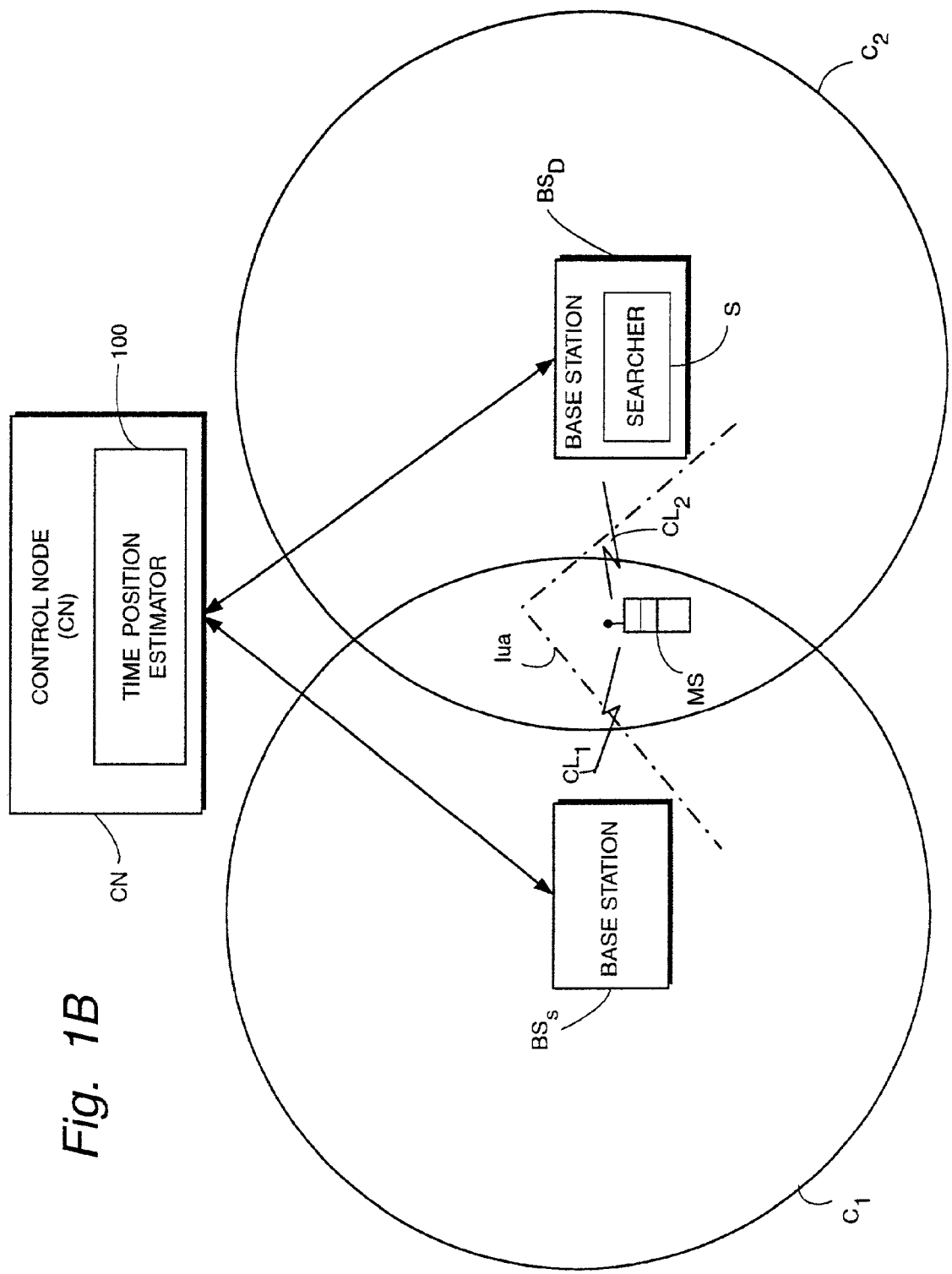
FIG. 1B is a schematic view showing the system of FIG. 1A during a soft handover situation.

At the time shown in FIG. 1A, a mobile station (MS) has a call connection leg $CL_1$ over the air interface Iua only with source base station $BS_s$. But as the mobile station (MS) moves in the direction of arrow D (see FIG. 1A), the mobile station (MS) enters a region (shown as an overlap of cells $C_1$ and $C_2$ in FIG. 1B) in which transmissions from the base station destination $BS_D$ can also be received by mobile station (MS). When the strength of the transmissions received from base station $BS_D$ so justify, an additional leg $CL_2$ of the connection with the mobile station (MS) is added through base station $BS_D$ (see FIG. 1B) in a soft handover operation.

The present invention particularly concerns a soft handover situation such as that described above wherein, for a user equipment unit having a leg of a connection already established with the source base station, a further leg of the connection is established with the destination base station. As explained previously, soft handover includes synchronization of the mobile station (MS) with the destination base station. Synchronization of the mobile station (MS) with the destination base station $BS_D$ involves the searcher S at the destination base station $BS_D$ (see FIG. 1B). The searcher S (also known herein as the synchronization searcher) employs a synchronization search window to detect, for synchronization purposes, a transmission of the mobile station (MS) during a handover of a connection to the destination base station $BS_D$.

Unlike the source base station $BS_s$, in attempting the synchronization the destination base station $BS_D$ lacks the random access procedure that allows the respective downlink and uplink trip propagation delays between the mobile station (MS) and the destination base station $BS_D$. Because the propagation delay between the mobile station (MS) and the destination base station $BS_D$ is unknown, without the present invention the searcher S might be forced to scan all possible delays of the known pilot code PN sequence transmitted by the mobile station (MS). If it were required to do so, the searcher S of the destination base station $BS_D$ would have to consider all possible time delays of the known PN code sequence up to a worst case scenario where the mobile station (MS) is located at the edge of the cell border. The number of time delays corresponding to the radius of the cell $C_2$ served by the destination base station $BS_D$ defines an uncertainty region considerably larger than a typical search window used to track the various paths of a channel impulse response.

Rather than lengthen the search window with its increased data processing, memory, and delay, the present invention provides the searcher S of the destination base station $BS_D$ with a judicious start position for its synchronization search window. In particular, the start position provided to searcher S is a statistically-ascertained time position (e.g., a statistical estimate) at which other mobile stations previously initiated handover from the source base station $BS_s$ to the destination base station $BS_D$. This statistically-ascertained time position, which serves as the start position of the synchronization search window for the searcher S of the destination base station $BS_D$, is calculated by a time position estimator 100. In the example illustrated embodiment, the time position estimator is situated at the control node CN of the code division multiple access communication system. The control node CN communicates the start time position to the searcher S of the destination base station $BS_D$.

In a non-limiting example embodiment, the time position estimator 100 uses, as the statistically-ascertained time position, an average time position at which other mobile stations previously initiated handover from the source base station to the destination base station. In an illustrated example embodiment, the time position estimator 100 maintains a filter which calculates a filter output value of the average time position $T_{new}$ for a specified mobile station, e.g., a mobile station now undergoing soft handover. The filter output value is calculated using Expression 1.

$$T_{new}=a*T_{old}+(1-a)*T_{last}.$$ Expression 1

In Expression 1, $T_{last}$ is a time position found for a last mobile station which initiated handover from the source base station to the destination base station prior to the specified mobile station; $T_{old}$ is an output value of the filter prior to the filter being updated with the time position found for the last mobile station which initiated handover from the source base station to the destination base station prior to the specified mobile station; and a is a weighting factor.

In the example illustrated embodiment, the time position estimator 100 is situated at a radio network control (RNC) node of the code division multiple access communication system, but can be located at other nodes. The node whereat the time position estimator resides communicates the start time position to the synchronization searcher of the destination base station. For example, the start time position can be communicated from the time position estimator 100 of the control node to the destination base station $BS_D$ in a radio link setup message on the NBAP interface. When the uplink synchronization procedure is completed, the UE time position is transferred to the time position estimator 100 in the control node using a radio ink restore indication message on the NBAP interface.

In performing the uplink synchronization with the mobile station, the searcher searches a search area. For a destination cell having a radius of about 35 kilometers, for example, the searcher divides the search area into thirty steps or slots, each slot being about ten microseconds. The search area is searched by the searcher S, slot by slot, using a search window.

The start position SP calculated by time position estimator 100 [i.e., $T_{new}$] is a time position (preferably expressed in microseconds) which enables the searcher algorithm of the searcher to know where to commence its evaluation of the received transmission of the mobile station (MS). The start position SP calculated and received from time position estimator 100 enables the searcher S to determine with which of its steps or slots to begin its search. For example, the searcher S can center its search window about the slot corresponding to the start position SP calculated and received from time position estimator 100.

Figure 2:
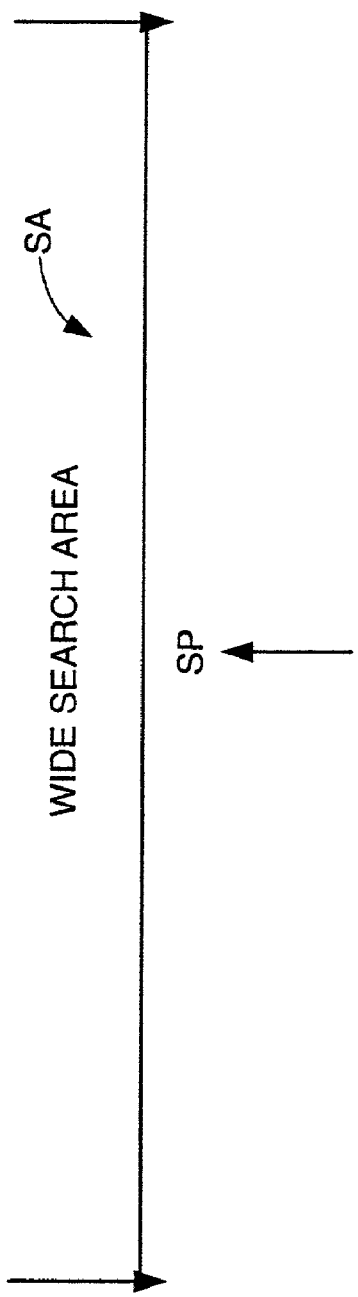
FIG. 2 is a diagrammatic view of a search area for a searcher of a destination base station.

In the above regard, upon receipt of start position calculated by the time position estimator 100, the searcher S of the destination base station $BS_D$ starts looking for a transmission from the mobile station (MS) at the communicated start position SP (e.g., at the average time position calculated by time position estimator 100 in the illustrated embodiment). More formally, the searcher S begins looking for the channel impulse response of the signal received from the mobile station (MS) by centering its search window about the start position SP. Thus, given its rather wide search area SA as illustrated in FIG. 2, the searcher S can intelligently hone in on the start position SP [= $T_{new}$] calculated and relayed to it by the time position estimator 100.

Figure 3:
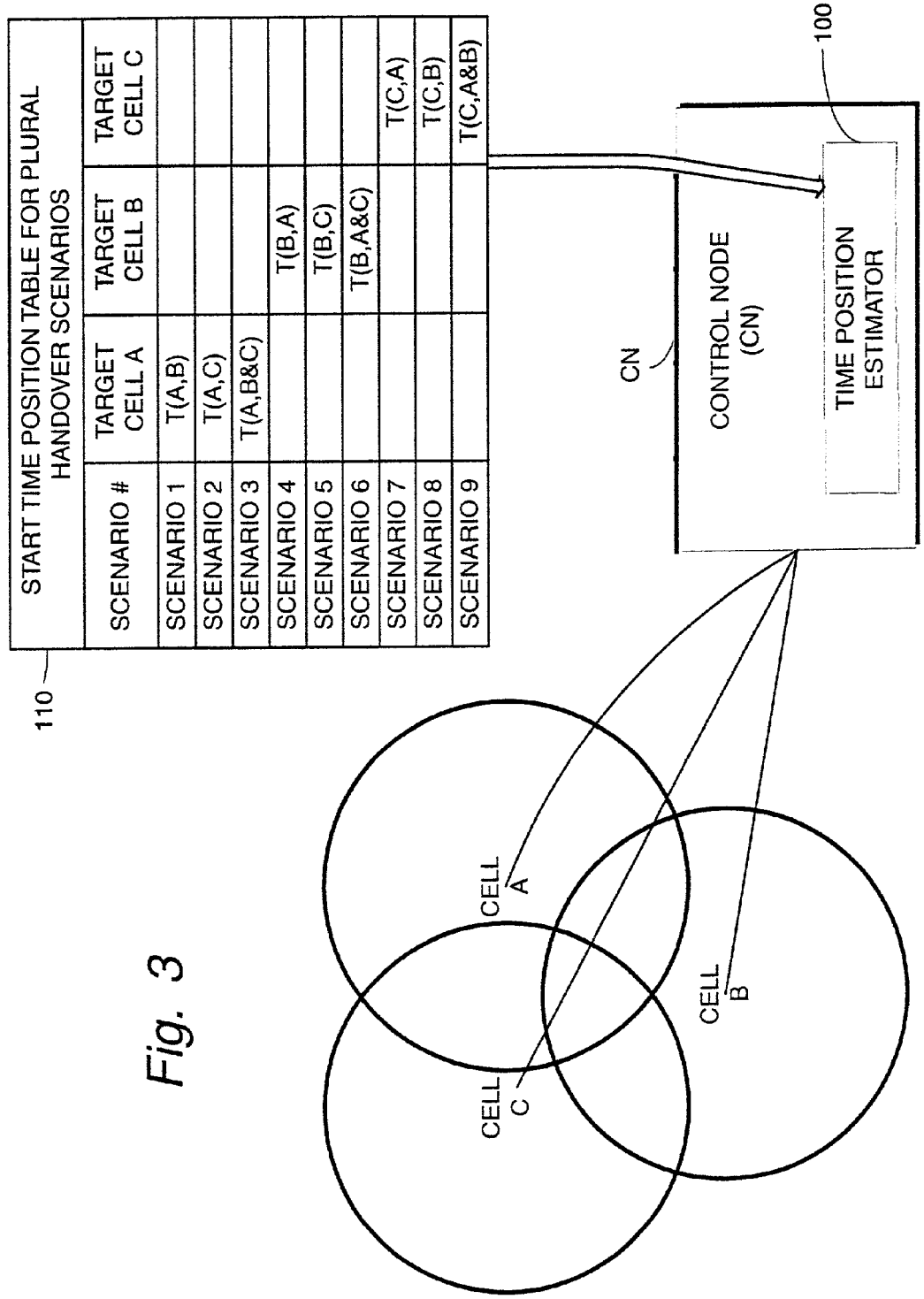
FIG. 3 is a diagrammatic view showing, in the context of a multi-cell area, a table which maintains a corresponding start time for plural potential handover scenarios.

In another aspect of the invention, illustrated in FIG. 3, the time position estimator 100 maintains a table 110 which, for each of plural scenarios of source base stations and destination base stations, stores a corresponding scenario-specific start time position. For each handover scenario, the time position estimator 100 keeps track of the average mobile station (MS) time position at handover. In FIG. 3, the notation T(D,S) means the average time position (e.g., $T_{new}$ of Expression 1) at handover when the connection leg to be added is for cell D and the mobile station (MS) already has a connection leg in cell S. FIG. 3 shows only three cells, in particular cell A, cell B, and cell C. It should be understood, however, that the time position estimator 100 can keep track of the scenario-specific start time in a configuration involving a different number of cells.

Figure 4:
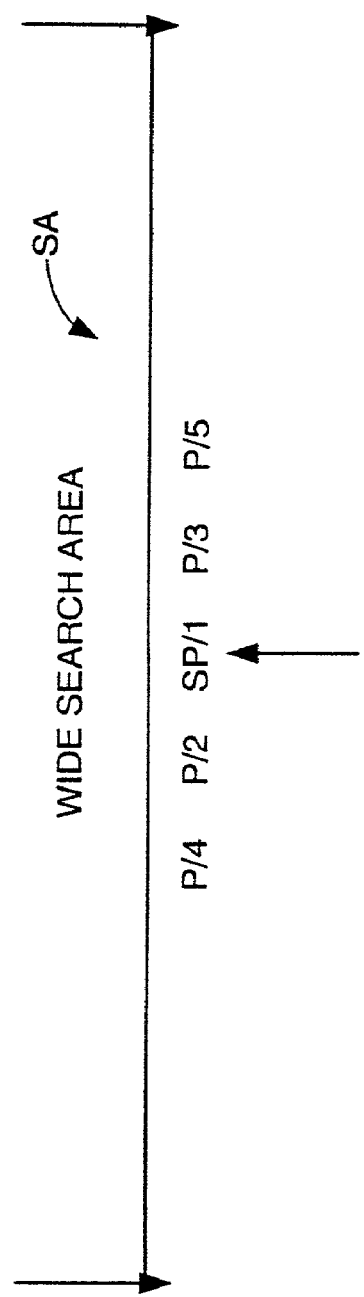
FIG. 4 is a diagrammatic view illustrating a circularly expanding search of a search area in accordance with an aspect of the present invention.

In accordance with yet another aspect of the present invention, if the mobile station is not found at the start time position SP, in the manner illustrated in FIG. 4 the searcher S attempts to find the transmission of the mobile station by looking at one or more search window positions which neighbor the start time position SP. More particularly, with a failure to find the transmission of the specified mobile station at the start time position SP communicated to it by time position estimator 100, the synchronization searcher looks at progressively remote neighboring search window positions relative to the start time position. That is, if the specified mobile station is not found at the start time position SP/1 of FIG. 4, the synchronization searcher attempts to find the transmission of the mobile station by looking at a first neighboring search window position on a first side of the start time position (e.g., position P/2). This is done by centering the search window of the searcher S about the slot which neighbors on the first side the slot corresponding to the start time position SP/1. Then, if necessary, the searcher S looks at a second neighboring search window position (e.g., position P/3) on a second side of the start time position (e.g., centering the search window about the slot which neighbors on the second side the slot corresponding to the start time position SP/1). The first neighboring search window position P/2 on the first side of the start time position and the second neighboring search window position P/3 on the second side of the start time position comprise a set of most neighboring search window positions. Upon failure to find the transmission of the specified mobile station at either of the most neighboring search window positions, the searcher S looks at progressively remote sets of neighboring search window positions, e.g., at positions P/4 and P/5. The searcher S thus looks in a widening circle of search positions about the start search position. Each search position comprises a 10 microsecond step. The search is repeated through as many as thirty steps if necessary until the mobile station (MS) is found. Seen from a statistical point of view, the average duration of the search time will be shortened, while the peak search time is still high.

Figure 5:
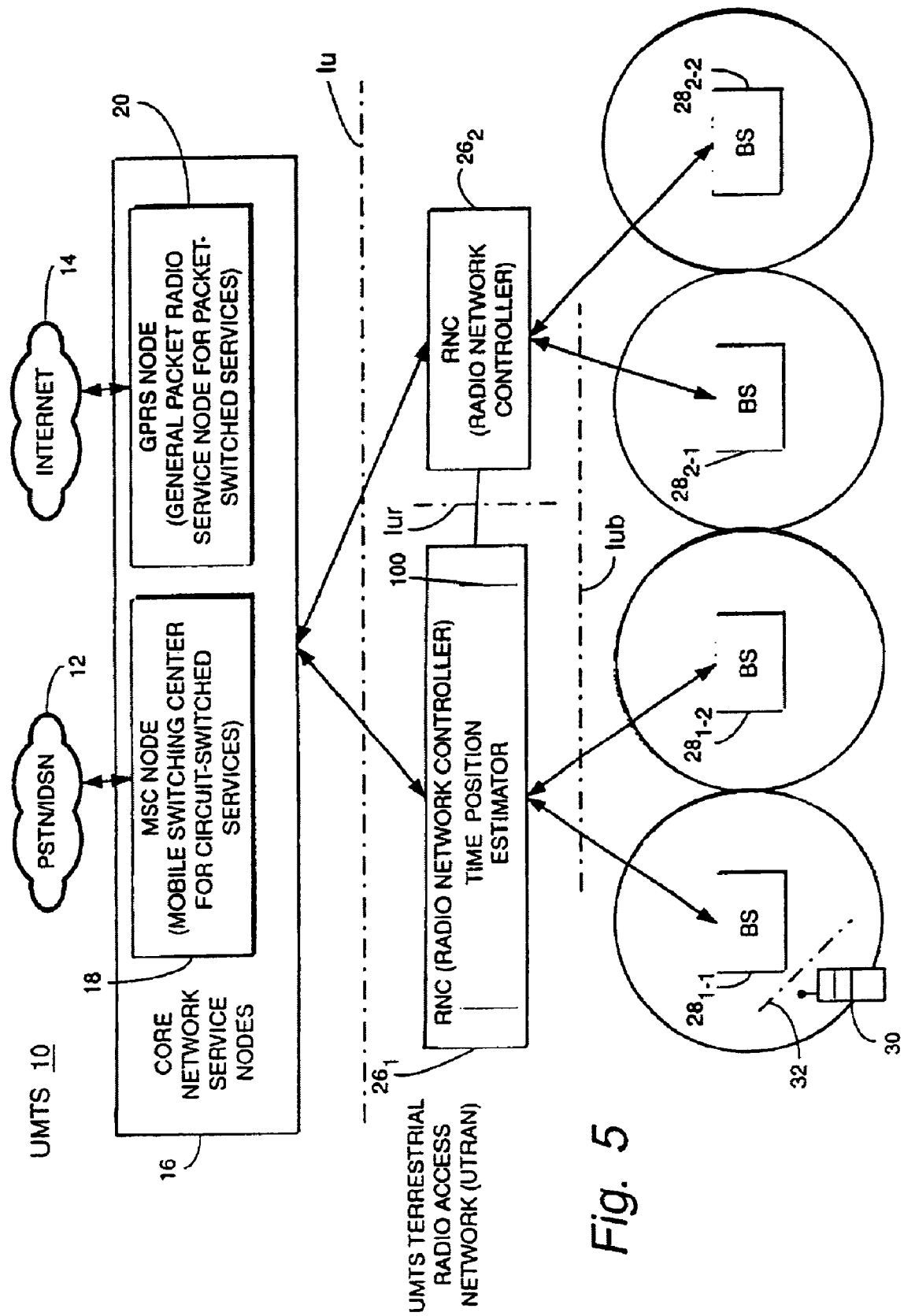
FIG. 5 is diagrammatic view of example mobile communications system in which the present invention may be advantageously employed.

One non-limiting, example deployment of the present invention is described in the context of a universal mobile telecommunications (UMTS) 10 shown in FIG. 5. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) over a radio access network (RAN) interface referred to as the Iu interface. UTRAN includes one or more radio network controllers (RNCs) 26. For sake of simplicity, the UTRAN of FIG. 5 is shown with only two RNC nodes, particularly RNC $26_1$ and RNC $26_2$. In FIG. 5, for sake of simplicity only one of the RNC nodes 26 is shown with a time position estimator 100 of the present invention. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 6 shows that an RNC can be connected over an Iur interface to one or more other RNCs in the URAN.

A mobile station (MS), such as mobile station (MS) 30 shown in FIG. 5, communicates with one or more base stations (BS) 28 over a radio or air interface 32. Each of the radio interface 32, the Iu interface, the Iub interface, and the Iur interface are shown by dash-dotted lines in FIG. 5.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station (MS) or equipment unit (UE) 30 is assigned its own scrambling code in order for a base station 28 to identify transmissions from that particular mobile station (MS) as well as for the mobile station (MS) to identify transmissions from the base station intended for that mobile station (MS) from all of the other transmissions and noise present in the same area.

Figure 6:
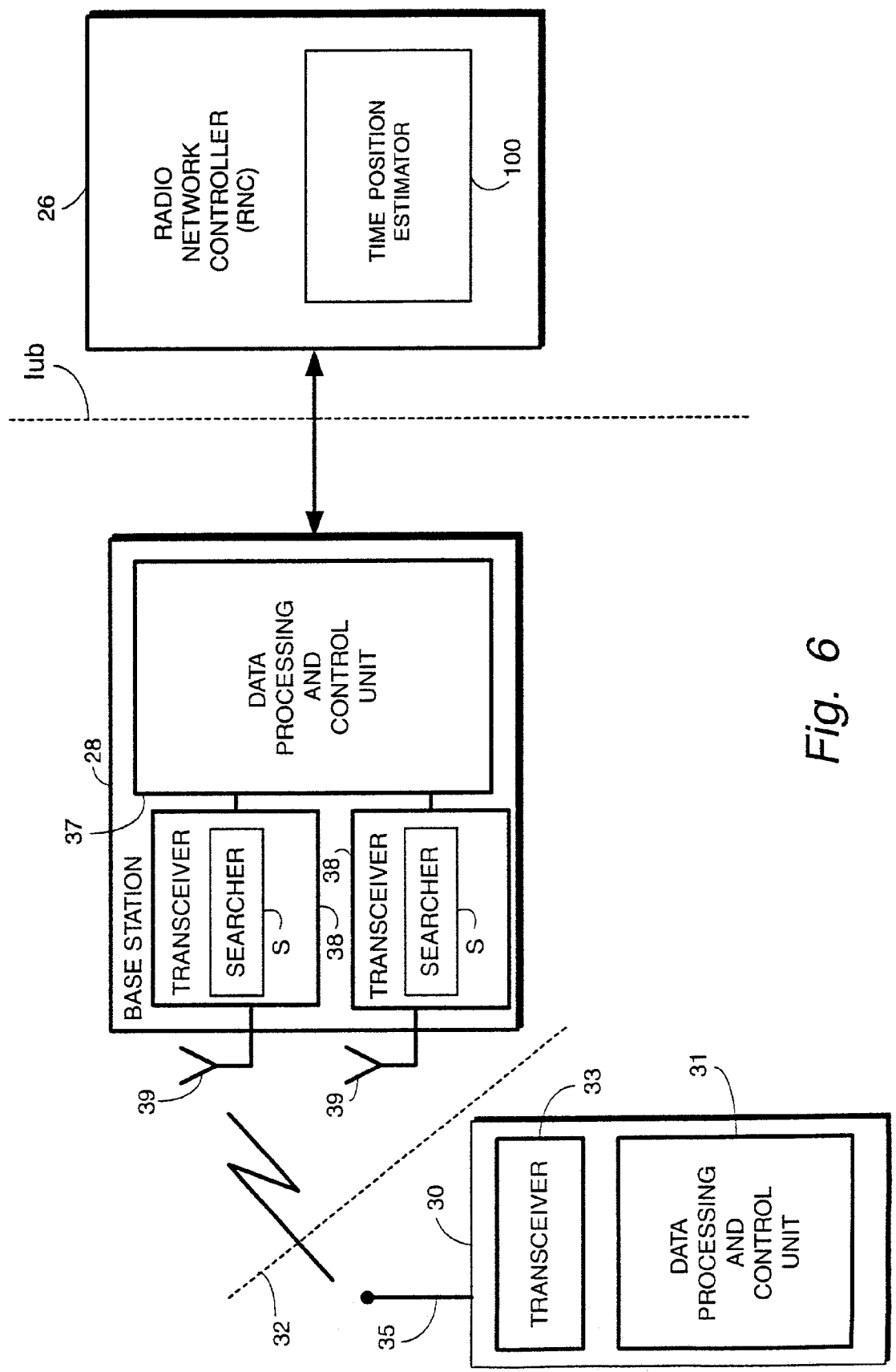
FIG. 6 is a simplified function block diagram of a portion of a UMTS Terrestrial Radio Access Network, including a mobile station (MS) station; a radio network controller; and a base station.

FIG. 6 shows selected general aspects of mobile station (MS) 30 and illustrative nodes such as radio network controller 26 and base station 28. The mobile station (MS) 30 shown in FIG. 6 includes a data processing and control unit 31 for controlling various operations required by the mobile station (MS). The data processing and control unit 31 of the mobile station (MS) provides control signals as well as data to a radio transceiver 38 connected to an antenna 35.

The example radio network controller 26 and base station 28 as shown in FIG. 6 are radio network nodes that each include a corresponding data processing and control unit 36 and 37, respectively, for performing numerous radio and data processing operations required to conduct communications between the RNC 26 and the user equipment units (UEs) 30. The data processing and control unit 36 of the RNC includes the time position estimator 100 of the present invention, while the transceivers 38 of the base station 28 includes a searcher S. Part of the equipment controlled by the base station data processing and control unit 37 includes plural radio transceivers 38 connected to one or more antennas 39.

Figure 7:
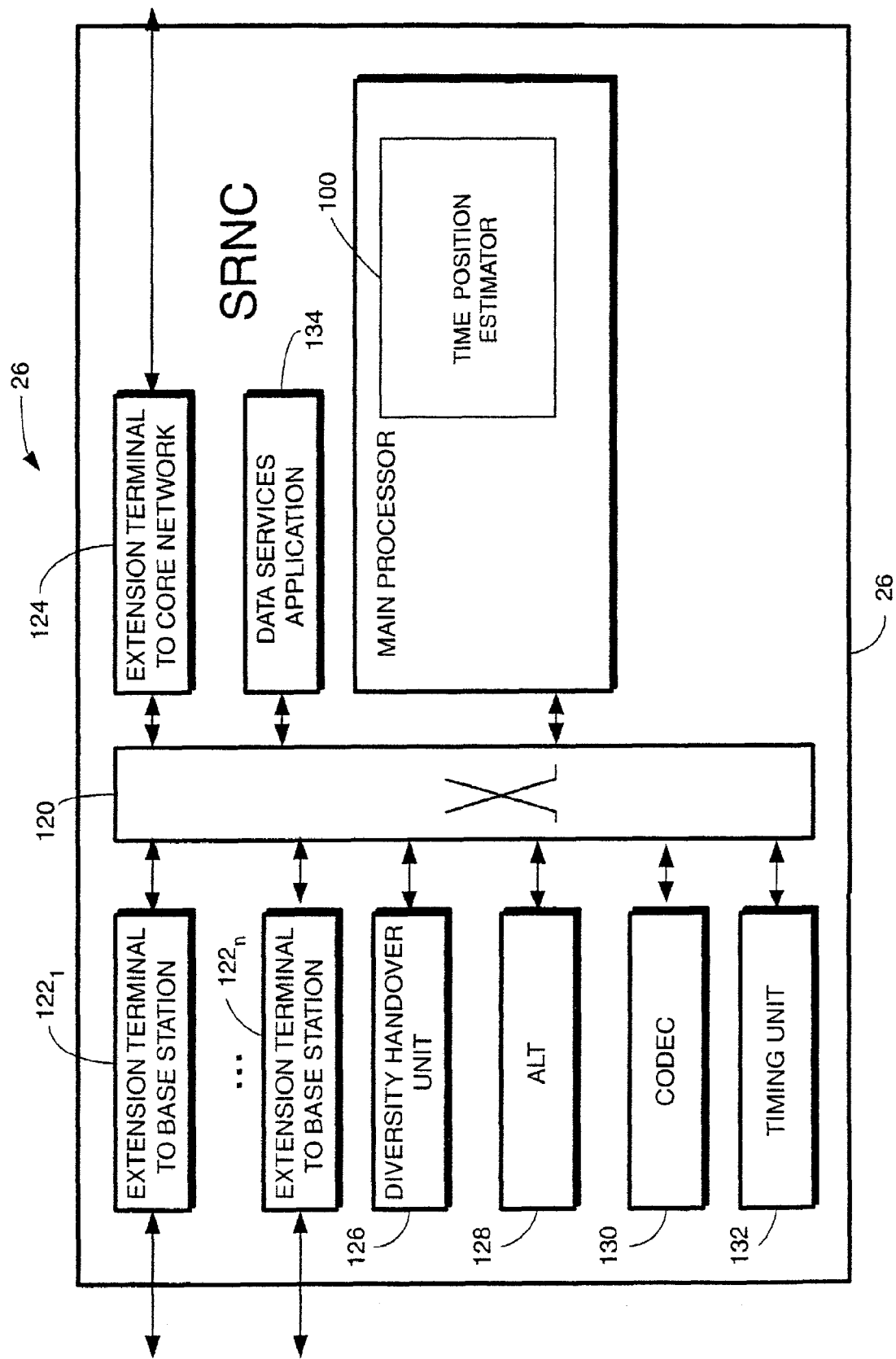
FIG. 7 is a schematic view of an example RNC node in accordance with one embodiment of the invention.

FIG. 7 illustrates, in somewhat more detail, an example non-limiting RNC node 26 of the present invention. It so happens that the RNC node 26 of FIG. 7 is a switched-based node having a switch 120. The switch 120 serves to interconnect other constituent elements of RNC node 26. Such other constituent elements include extension terminals $122_1$ through $122_n$, as well as extension terminal 124. Extension terminals $122_1$ through $122_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; an ALT unit 128; codex 130;

timing unit 132; a data services application unit 134; and, a main processor 140. The person skilled in the art will appreciate generally the functions of these constituent elements, it being noted that the ALT unit 128 is a unit which provides, e.g., multiplexing and demultiplexing and (optionally) queuing with regard to differing protocols of cells. In one example implementation of the present invention, the time position estimator 100 can be performed by the main processor 140.

Figure 8:
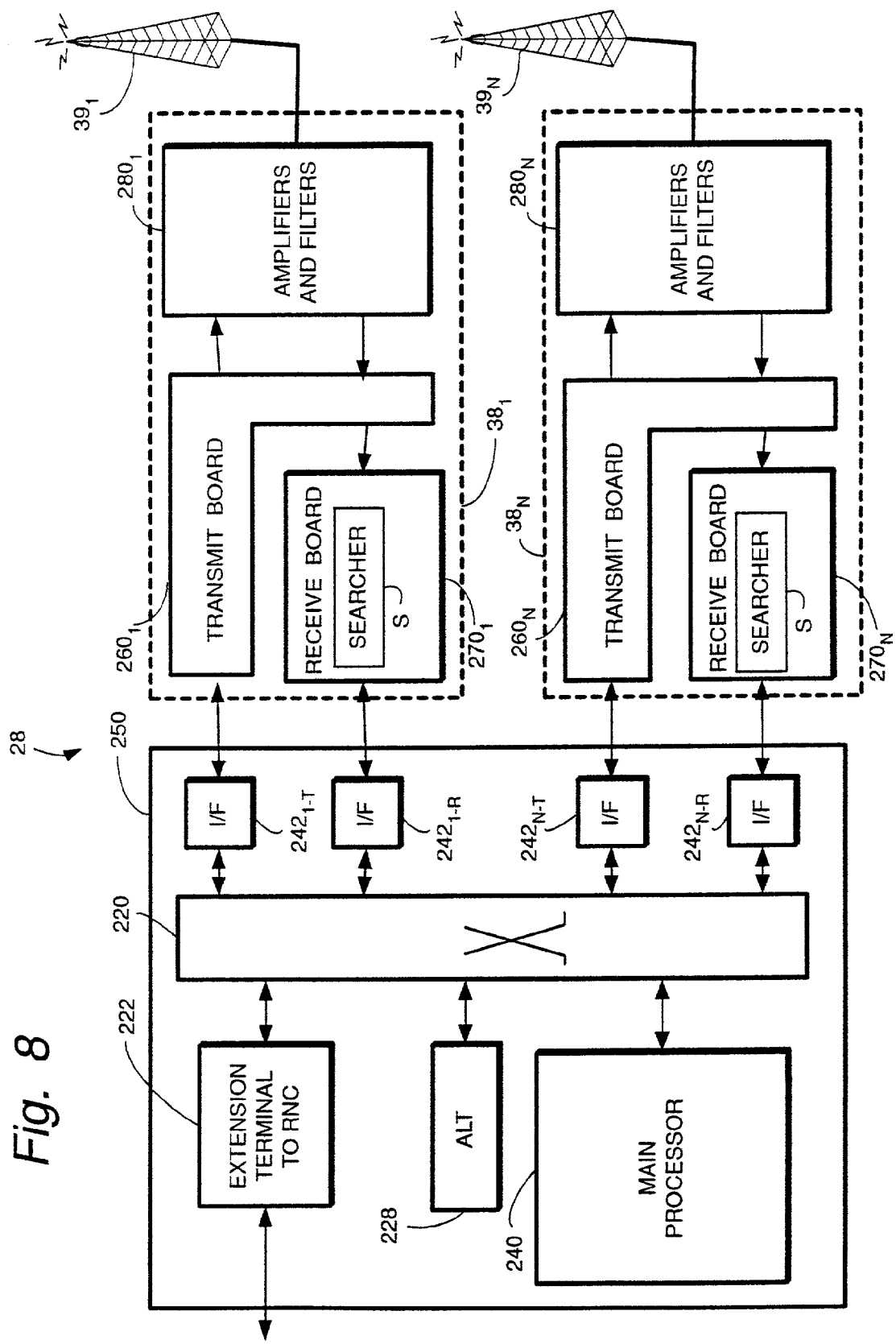
FIG. 8 is a schematic view of an example base station node in accordance with one embodiment of the invention.

FIG. 8 illustrates, in non-limiting manner, more details of an example base station (BS) node 28 in accordance with one embodiment of the present invention. As with RNC node 26, the base station (BS) node 28 of FIG. 8 is a switched-based node having a switch 220 which serves to interconnect other constituent elements of base station (BS) node 28. Such other constituent elements include extension terminal 222; ALT unit 228; BS main processor 240, and interface boards 242.

Extension terminal 222 connects base station (BS) node 28 to radio network controller (RNC) node 26, and thus comprises the Iub interface. As in the case of radio network controller (RNC) node 26, the ALT unit 228 is a unit which provides, e.g., multiplexing and demultiplexing and (optionally) queuing with regard to differing protocols of cells. A searcher S is located in each of the receive boards 270 of the transceivers 38.

Details of synchronization searchers in general can be gleaned from one or more of the following U.S. Patent Applications, both of which are incorporated herein by reference: U.S. patent application Ser. No. 09/452,105, entitled "Synchronization of Diversity Handover Destination Base Station"; and U.S. patent application Ser. No. 09/070,778, entitled "Search Window Delay Tracking In Code Division Multiple Access Communication System".

The present invention advantageously decreases the duration of the search time, on average, for the wide area search. This means that the delay when adding a new soft handover leg for a connection can be shortened, which in turn means increased capacity and lowered risk for dropped calls at handover.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a code division multiple access communication system having a source base station and a destination base station where a specified mobile station establishes a connection with the source base station, the method comprising:

initiating a handover of the connection involving the specified mobile station to the destination base station;

establishing a start position of a synchronization search window for the specified mobile station at a statistically-ascertained search window time position based on search window start time positions for other mobile stations which previously initiated handover from the source base station to the destination base station, the statistically-ascertained search window start time position for the specified mobile station being an average search window start time position for other mobile stations which previously initiated handover from the source base station to the destination base station;

maintaining a filter which calculates a filter output value of the average search window start time position for the specified mobile station, wherein maintaining the filter comprises:

using a search window start time position found for a last mobile station which initiated handover from the source base station to the destination base station prior to the specified mobile station; and using an output value of the filter prior to the filter being updated with the search window start time position found for the last mobile station which initiated handover from the source base station to the destination base station prior to the specified mobile station.

2. The method of claim 1, wherein the statistically-ascertained search window start time position is calculated using the expression $$T_{new} = a * T_{old} + (1-a) * T_{last}$$

where:

$T_{new}$ is the filter output value of the average time position for the specified mobile;

$T_{last}$ is the search window start time position found for the last mobile station which initiated handover from the source base station to the destination base station prior to the specified mobile station;

$T_{old}$ is the output value of the filter prior to the filter being updated with the search window start time position found for the last mobile station which initiated handover from the source base station to the destination base station prior to the specified mobile station; and a is a weighting factor.

3. The method of claim 1, further comprising maintaining the filter at a radio network control node of the code division multiple access communication system.

4. The method of claim 1, further comprising:

determining the statistically-ascertained search window start time position at a radio network controller node; and communicating the statistically-ascertained search window start time position from the radio network controller node to the destination base station.

5. The method of claim 4, further comprising maintaining at the radio network control node a table which, for each of plural scenarios of source base stations and destination base stations, stores a corresponding scenario-specific statistically-ascertained search window start time position.

6. The method of claim 1, wherein if the specified mobile station is not found at the search window start time position, the method further comprises attempting to find a transmission of the specified mobile station by looking at a search window position which neighbors the search window start time position.

7. A method of operating a code division multiple access communication system having a source base station and a destination base station where a specified mobile station establishes a connection with the source base station, the method comprising:

initiating a handover of the connection involving the specified mobile station to the destination base station;

establishing a start position of a synchronization search window for the specified mobile station at a statistically-ascertained search window time position based on search window start time positions for other mobile stations which previously initiated handover from the source base station to the destination base station;

if the specified mobile station is not found at the search window start time position, attempting to find a transmission of the specified mobile station by looking at a search window position which neighbors the search window start time position; and with a failure to find the transmission of the specified mobile station, looking at progressively remote neighboring search window positions relative to the search window start time position.

8. A method of operating a code division multiple access communication system having a source base station and a destination base station where a specified mobile station establishes a connection with the source base station, the method comprising:

initiating a handover of the connection involving the specified mobile station to the destination base station;

establishing a start position of a synchronization search window for the specified mobile station at a statistically-ascertained search window time position based on search window start time positions for other mobile stations which previously initiated handover from the source base station to the destination base station;

if the specified mobile station is not found at the search window start time position, attempting to find a transmission of the specified mobile station by looking at a search window position which neighbors the search window start time position; and if the specified mobile station is not found at the search window start time position, attempting to find the transmission of the specified mobile station by:

looking a first neighboring search window position on a first side of the search window start time position; and then, if necessary, looking at a second neighboring search window position on a second side of the search window start time position.

9. The method of claim 8, wherein the first neighboring search window position on the first side of the search window start time position and the second neighboring search window position on the second side of the search window start time position comprise a set of most neighboring search window positions, and wherein, upon failure to find the transmission of the specified mobile station at either of the most neighboring search window positions, looking at progressively remote sets of neighboring search window positions.

10. The method of claim 1, further comprising synchronizing the destination base station with a transmission from the specified mobile station using the search window to detect a transmission of the specified mobile station received at the destination base station.

11. A code division multiple access communication system comprising:

a source base station;

a destination base station having a synchronization searcher;

a time position estimator which establishes a start position of a synchronization search window for the synchronization searcher of the destination base station, the synchronization search window being used to detect a transmission of a specified mobile station received at the destination base station during a handover of a connection involving the specified mobile station from a source base station to the destination base station, the time position estimator establishing the start position of the synchronization search window as a statistically-ascertained search window time position based on time positions for other mobile stations which previously initiated handover from the source base station to the destination base station;

wherein the statistically-ascertained time position for the specified mobile station is an average search window start time position for other mobile stations which previously initiated handover from the source base station to the destination base station, wherein the time position estimator maintains a filter which calculates a filter output value of the average time position for the specified mobile station;

wherein the filter uses a search window start time position found for a last mobile station which initiated handover from the source base station to the destination base station prior to the specified mobile station; and wherein the filter uses an output value of the filter prior to the filter being updated with the time position found for the last mobile station which initiated handover from the source base station to the destination base station prior to the specified mobile station.

12. The apparatus of claim 11, wherein the statistically-ascertained time position is calculated using the expression $$T_{new}=a*T_{old}+(1-a)*T_{last}$$

where:

$T_{new}$ is the filter output value of the average time position for the specified mobile;

$T_{last}$ is the search window start time position found for the last mobile station which initiated handover from the source base station to the destination base station prior to the specified mobile station;

$T_{old}$ is the output value of the filter prior to the filter being updated with the time position found for the last mobile station which initiated handover from the source base station to the destination base station prior to the specified mobile station; and a is a weighting factor.

13. The apparatus of claim 11, wherein the time position estimator resides at a radio network control node of the code division multiple access communication system.

14. The apparatus of claim 13, wherein the radio network controller node communicates the search window start time position to the destination base station.

15. The apparatus of claim 11, wherein the time position estimator maintains a table which, for each of plural scenarios of source base stations and destination base stations, stores a corresponding scenario-specific search window start time position.

16. The apparatus of claim 11, wherein if the specified mobile station is not found at the search window start time position, the destination base station attempts to find a transmission of the specified mobile station by looking at a search window position which neighbors the start time position.

17. A code division multiple access communication system comprising:

a source base station;

a destination base station having a synchronization searcher;

a time position estimator which establishes a start position of a synchronization search window for the synchronization searcher of the destination base station, the synchronization search window being used to detect a transmission of a specified mobile station received at the destination base station during a handover of a connection involving the specified mobile station from a source base station to the destination base station, the time position estimator establishing the start position of the synchronization search window as a statistically-ascertained search window time position based on time positions for other mobile stations which previously initiated handover from the source base station to the destination base station;

wherein if the specified mobile station is not found at the search window start time position, the destination base station attempts to find a transmission of the specified mobile station by looking at a search window position which neighbors the start time position; and wherein, with a failure to find the transmission of the specified mobile station, the destination base station looks at progressively remote neighboring search window positions relative to the start time position.

18. A code division multiple access communication system comprising:

a source base station;

a destination base station having a synchronization searcher;

a time position estimator which establishes a start position of a synchronization search window for the synchronization searcher of the destination base station, the synchronization search window being used to detect a transmission of a specified mobile station received at the destination base station during a handover of a connection involving the specified mobile station from a source base station to the destination base station, the time position estimator establishing the start position of the synchronization search window as a statistically-ascertained search window time position based on time positions for other mobile stations which previously initiated handover from the source base station to the destination base station;

wherein if the specified mobile station is not found at the search window start time position, the destination base station attempts to find a transmission of the specified mobile station by looking at a search window position which neighbors the start time position; and wherein if the specified mobile station is not found at the start time position, the destination base station attempts to find the transmission of the specified mobile station by looking at a first neighboring search window position on a first side of the search window start time position, and then, if necessary, looking at a second neighboring search window position on a second side of the search window start time position.

19. The apparatus of claim 18, wherein the first neighboring search window position on the first side of the search window start time position and the second neighboring search window position on the second side of the search window start time position comprise a set of most neighboring search window positions, and wherein, upon failure to find the transmission of the specified mobile station at either of the most neighboring search window positions, the destination base station looks at progressively remote sets of neighboring search window positions.

20. The apparatus of claim 11, wherein the destination base station starts synchronization of a mobile-to-source leg when the searcher sees a predetermined transmission from the specified mobile station.

21. A time position estimator situated at a node of code division multiple access communication system comprising, the time position estimator serving to establish a start position of a synchronization search window for a synchronization searcher of a destination base station, the synchronization search window being used to detect a transmission of a specified mobile station received at the destination base station during a handover of a connection involving the specified mobile station from a source base station to the destination base station, the time position estimator establishing the start position of the synchronization search window as a statistically-ascertained search window start time position based on search window start time positions for other mobile stations which previously initiated handover from the source base station to the destination base station;

wherein the statistically-ascertained time position for the specified mobile station is an average search window start time position at which other mobile stations previously initiated handover from the source base station to the destination base station, wherein the time position estimator maintains a filter which calculates a filter output value of the average search window start time position for the specified mobile station;

wherein the filter uses a search window start time position found for a last mobile station which initiated handover from the source base station to the destination base station prior to the specified mobile station; and wherein the filter uses an output value of the filter prior to the filter being updated with the time position found for the last mobile station which initiated handover from the source base station to the destination base station prior to the specified mobile station.

22. The apparatus of claim 21, wherein the statistically-ascertained time position is calculated using the expression $$T_{new}=a*T_{old}+(1-a)*T_{last}$$

where:

$T_{new}$ is the filter output value of the average time position for the specified mobile;

$T_{last}$ is the search window start time position found for the last mobile station which initiated handover from the source base station to the destination base station prior to the specified mobile station;

$T_{old}$ is the output value of the filter prior to the filter being updated with the time position found for the last mobile station which initiated handover from the source base station to the destination base station prior to the specified mobile station; and a is a weighting factor.

23. The apparatus of claim 21, wherein the time position estimator resides at a radio network control node of the code division multiple access communication system.

24. The apparatus of claim 23, wherein the radio network controller node communicates the search window start time position to the destination base station.

25. The apparatus of claim 21, wherein the time position estimator maintains a table which, for each of plural scenarios of source base stations and destination base stations, stores a corresponding scenario-specific search window start time position.

26. A synchronization searcher for a destination base station of a code division multiple access communication system, the synchronization searcher using a synchronization search window to detect a transmission of a mobile station during a handover of a connection involving the mobile station to the destination base station, there being a start position of the synchronization search window, the start position of the synchronisation search window being based on search window start time positions for other mobile stations which previously initiated handover from the source base station to the destination base station, wherein if the specified mobile station is not found at the search window start time position, the synchronization searcher attempts to find the transmission of the mobile station by looking at a search window position which neighbors the search window start time position;

wherein, with a failure to find the transmission of the specified mobile station, the synchronization searcher looks at progressively remote neighboring search window positions relative to the search window start time position.

27. The apparatus of claim 26, wherein the synchronization searcher starts synchronization of a mobile-to-source leg upon seeing a predetermined transmission from the mobile station.

28. A synchronization searcher for a destination base station of a code division multiple access communication system, the synchronization searcher using a synchronization search window to detect a transmission of a mobile station during a handover of a connection involving the mobile station to the destination base station, there being a start position of the synchronization search window, the start position of the synchronization search window being based on search window start time positions for other mobile stations which previously initiated handover from the source base station to the destination base station, wherein if the specified mobile station is not found at the search window start time position, the synchronization searcher attempts to find the transmission of the mobile station by looking at a search window position which neighbors the search window start time position;

wherein if the specified mobile station is not found at the search window start time position, the synchronization searcher attempts to find the transmission of the mobile station by looking at a first neighboring search window position on a first side of the search window start time position, and then, if necessary, looking at a second neighboring search window position on a second side of the search window start time position.

29. The apparatus of claim 28, wherein the first neighboring search window position on the first side of the search window start time position and the second neighboring search window position on the second side of the search window start time position comprise a set of most neighboring search window positions, and wherein, upon failure to find the transmission of the specified mobile station at either of the most neighboring search window positions, the synchronization searcher looks at progressively remote sets of neighboring search window positions.

* * * * *